Figure 1:
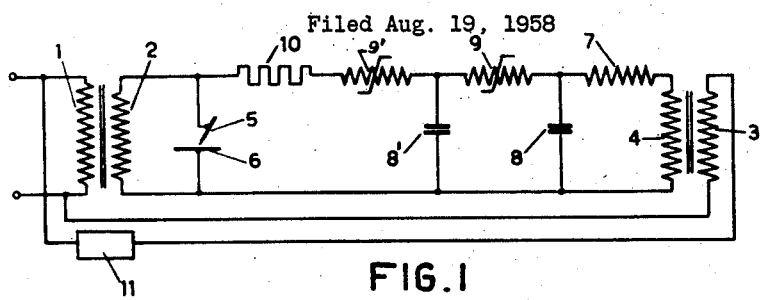

June 16, 1959      J. LISSER      2,891,196

ALTERNATING CURRENT ARC WELDING DEVICES

Filed Aug. 19, 1958

United States Patent Office 2,891,196
Patented June 16, 1959

2,891,196

ALTERNATING CURRENT ARC WELDING DEVICES

Jacques Lisser, Nijmegen, Netherlands, assignor to Willem Smit & Co's Transformatorenfabriek N.V., Nijmegen, Netherlands, a company of the Netherlands Application August 19, 1958, Serial No. 755,944

Claims priority, application Netherlands August 24, 1957

6 Claims. (Cl. 315—173)

The present invention relates to a device for arc welding by means of alternating current comprising a source of alternating current, e.g. a welding transformer, and a composite auxiliary circuit which contains an impulse circuit cooperating with the welding arc and having a capacitor for the periodic supply of voltage impulses across said arc at points of time in the vicinity of those at which the welding current is zero and a loading circuit having an impedance, e.g. a choking coil, for periodically loading said capacitor.

A welding device of this type is known, in which a gas discharge tube operating as a switch is connected in series with the capacitor for the supply of voltage impulses to the impulse or discharge circuit and in which both the capacitor is periodically loaded and the gas discharge tube is periodically ignited by means of a transformer fed with the voltage of the welding arc and having a magnetic core of great permeability and with a relatively small zone of transition between the unsaturated and the saturated condition. This device has some disadvantages, viz. the use therein of a gas discharge tube, that means of a vulnerable and wearing element, and the fact that for loading the capacitor only the very short period is available, in which the magnetic core of the transformer is unsaturated so that for obtaining a predetermined impulse energy a relatively large and expensive transformer is required.

The present invention has the object to avoid the disadvantages of the known welding devices and to provide an apparatus in which no discharge tube is used for closing the impulse circuit and nearly the entire half cycle of the feeding voltage is available for loading the impulse capacitor so that much smaller transformers and choking coils suffice for the supply of a predetermined impulse energy. It consists in that provided in the impulse or discharge circuit is a choking coil having a magnetic core of great permeability and with a relatively small zone of transition between the unsaturated and the saturated condition.

The present invention makes it possible to connect in cascade a great number of impulse circuits. In that case there are inserted between the loading circuit and the impulse or discharge circuit one or more impulse circuits connected in series having each a capacitor and a choking coil provided with a magnetic circuit of great permeability and with a relatively very small zone of transition between the unsaturated and the saturated condition. Such a cascade connection is able to produce impulses of the same energy as but of smaller duration, that means of greater peak energy, than those produced by a single impulse circuit, whereby said connection will have a smaller output impedance. Consequently, for the production of these short impulses less input energy is required than for the production of impulses of longer duration when a certain peak power is to be given. Owing to the small output impedance the peak voltage will be less affected by the load impedance constituted by the welding transformer.

In some cases it is advantageous that only voltage impulses of predetermined polarity are generated. In these cases the welding device may be provided with means for the pre-magnetization by direct current of the magnetic core of the choking coil of at least one impulse circuit, so that said magnetic core can only be brought into the saturated condition in one direction by the current passing said choking coil during the loading period of the capacitor.

In order to obtain high impulse voltages the loading circuit and the capacitor may be so connected and so dimensioned as to constitute together an oscillatory circuit, of which the resonance frequency is equal to the frequency of the source of current.

The present invention makes it possible in a simple way to so construct the welding device as to have fired the voltage impulse by the transition of zero of the arc voltage itself. To that end the loading circuit and the impulse circuit must be so interconnected as to ensure that during the loading period of the capacitor the voltage of the latter has the same polarity as the voltage of the arc before passing zero and the choking coil of the impulse circuit must be so dimensioned as to ensure that said coil is unsaturated at each point of time before that at which the arc voltage passes zero and only becomes saturated as a result of the change of polarity of the arc voltage after the latter has passed zero. In that case the voltage of the capacitor will at each time during the transition of zero of the welding voltage, at which point of time the arc is extinguished, be in series with the no-load or feeding voltage which is leading in respect of the welding voltage and at that point of time has already the opposite polarity, so that the voltage across the impulse circuit is suddenly considerably increased and, thereby, the choking coil is immediately brought into the saturated condition and the impulse is produced between the welding electrode and the object to be welded.

In order to prevent the production of impulses when the welding transformer of the welding device is in its no-load condition the loading circuit may be fed by the series connection of the welding winding of said transformer or a part of said winding and a second source of alternating current, of which the voltage is at any time equal and in opposition to the no-load voltage of said welding winding or said part thereof. This second source of alternating current may be a second transformer fed by the feeding voltage. In that case the auxiliary circuit comprising the loading circuit and the impulse circuit or circuits is fed by the fall of voltage in the welding transformer.

Figure 2:
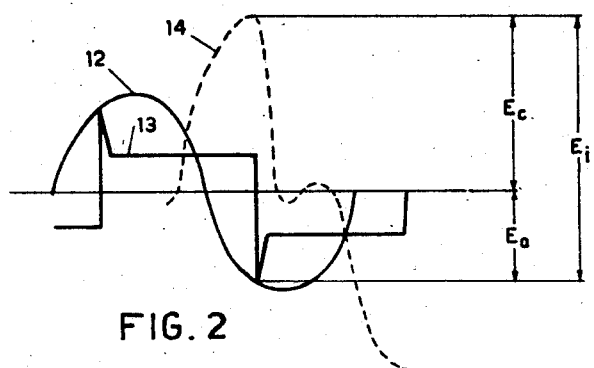
Figure 3:
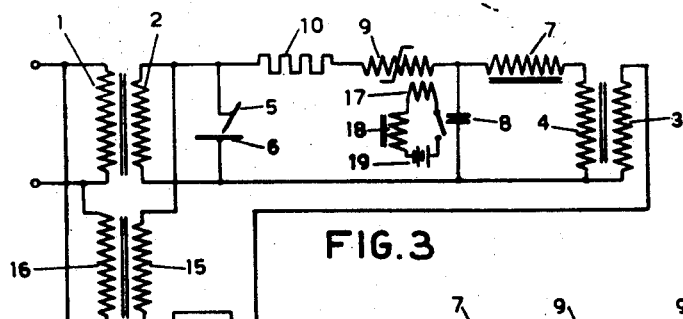
Figures 4, 5:
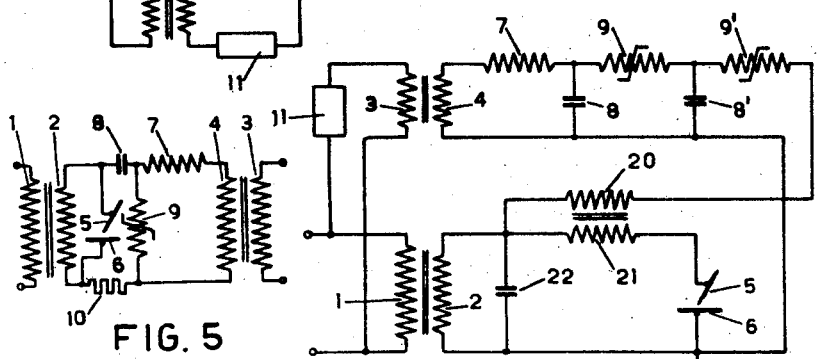

With these and other objects in view which will become apparent in the following detailed description, the present invention will be clearly understood in connection with the accompanying drawing, in which:

Figure 1 a diagram of connections of a first embodiment;

Fig. 2 voltage curves for the device shown in Fig. 1;

Fig. 3 a diagram of connections of a second embodiment;

Fig. 4 a diagram of connections of a third embodiment of the present invention; and Fig. 5 is a variant of the impulse circuits used in Figs. 1, 3 and 4.

In Figs. 1, 3, 4 and 5 the primary and the secondary winding of a welding transformer are designated by 1 and 2, the windings of a loading transformer by 3 and 4, the welding electrode and the body to be welded by 5 and 6, an inductive impedance by 7, impulse capacitors by 8 and 8', choking coils having special magnetic cores by 9 and 9', a resistance by 10 and a device for phase inversion by 11. The choking coils 9 and 9' have each a magnetic core of great permeability and with a very small zone of transition between the unsaturated and the saturated condition, so that these choking coils first have a substantially constant considerable inductance and then suddenly become saturated, whereby the inductance is reduced to a minimum, when the current increases. Consequently, these choking coils operate as switches. The resistance 10, which often is already present in the winding of the choking coil is adapted to damp interfering oscillations.

If the welding transformer 1, 2 is connected to the feeding network the capacitor 8 is loaded during a half cycle of the alternating current through the impedance 7. At the same time a magnetizing current flows through the choking coil 9, which current is very small owing to the high permeability. After a certain time the choking coil 9 becomes saturated so that practically no voltage is generated across said coil any more. In that case the capacitor 8' is connected almost directly in parallel with the capacitor 8. The impulse circuit 8, 9, 8' which is closed by the saturated choking coil 9 is an oscillatory circuit, in which the energy accumulated in the capacitor 8 will swing out with high frequency. In a very short time the energy of the capacitor 8 will be transferred to the capacitor 8' of the impulse circuit connected with the arc space. At the point of time at which the voltage across the capacitor 8' has reached a predetermined value the choking coil 9' will also become saturated and a voltage impulse will be produced across the arc space between the welding electrode and the body to be welded. Although the illustrated cascade connection is not definitely necessary, it has the advantage that the choking coil may be made smaller. The energy accumulated in the capacitor 8 during a half cycle of the feeding voltage is delivered to the arc space during a much smaller time. This time is determined by the self-frequency of the oscillatory circuit consisted of the capacitor 8', the saturated choking coil 9' and the arc space. The smaller the inductance of the choking coil 9' is made the higher said self-frequency and the shorter but more intensive the impulse current will be at an accumulated power which remains the same.

If the capacitors 8, 8', the choking coils 9, 9', the impedance 7, the feeding transformer 3, 4 and the phase inverting device 11 are well dimensioned the apparatus may be made so as to saturate the choking coil 9 at the point of time at which the welding current is zero. However it will be clear that to keep the right adjustment of such an apparatus will be difficult since the moment of the zero transition of the welding current depends on external conditions such as the adjustment of the welding current and the arc voltage. Said moment may vary during the welding process so that there is a risk that the impulse is produced too early or too late.

This difficulty will be avoided if the loading circuit and the impulse circuit or circuits are so interconnected as to ensure that the voltage across the capacitor during loading thereof has the same polarity as the arc voltage before its zero transition. Moreover, the choking coil of the impulse circuit which is directly loaded by the loading circuit must be so dimensioned as to ensure that said coil is unsaturated at any time before the zero transition of the arc voltage and becomes saturated only as a result of the polarity inversion of said voltage due to the zero transition thereof.

This principle, according to which the zero transition of the welding voltage is used to provoke the impulse, appears from the graph shown in Fig. 2. Therein 12 is the secondary no-load voltage of the welding transformer, 13 is the arc voltage and 14 is the voltage across the capacitor. From Fig. 2 it will be clear that the arc voltage 13 which is nearly in phase with the arc current is lagging in phase with respect to the no-load voltage. During the feeding of the welding arc the capacitor 8 is loaded. At the point of time, at which the arc voltage passes zero the arc is extinguished and the voltage across the capacitor 8 has reached the value Ec, whereas the magnetic core of the choking coil 9 is not yet saturated. Directly after the arc has been extinguished the polarity of the voltage across the arc space is inverted, said voltage then being the no-load voltage, so that a voltage is set up across the choking coil 9 which is approximately equal to $Ec+Eo=Ei$. This voltage $Ei$ amply suffices to produce in the choking coil a change of the flux which is required to obtain the condition of saturation. The effect thereof is that the capacitor 8 discharges approximately at the same moment as that of the zero transition of the arc voltage.

The device illustrated in Fig. 1 also produces impulses when the welding apparatus is in its no-load condition. With the aid of the device shown in Fig. 3 it is possible to produce voltage impulses across the arc space between the electrode 5 and the body 6 to be welded only when the welding process is going on. To that end the feeding transformer 3, 4 is fed by the series connection of the secondary winding 2 of the welding transformer 1, 2 and the secondary winding 15 of an auxiliary transformer 15, 16. The secondary winding 15 generates a voltage, which at any time is equal and in opposition to the no-load voltage of the welding transformer 1, 2. Thus the transformer 3, 4 of the loading circuit is fed with a voltage which is proportional to the drop of voltage in the welding transformer during the welding process. At the no-load condition said drop of voltage is nihil, so that the impulse capacitor can not be loaded to a value required for the production of impulses.

It may also be of advantage that only impulses of one polarity are delivered. In that case the choking coil 9 may be provided with an auxiliary winding 17, which is fed through a resistance or a choking coil 18 by a source 19 of direct current. By means of the auxiliary winding 17 the choking coil 9 may be so pre-magnetized as to ensure that its magnetic core is brought into the condition of saturation in one direction only by the current flowing through said coil during the loading period of the capacitor.

In the devices shown in Figs. 1 and 3 the voltage impulse is delivered to the arc space parallel to the welding voltage, however, in the device illustrated in Fig. 4 it is produced in series with the welding voltage. To the latter end an auxiliary transformer 20, 21 is provided in the impulse circuit, of which the primary winding 20 is connected to the impulse capacitor 8' in series with the choking coil 9' and the secondary winding 21 is connected to the welding transformer 1, 2 in series with the arc space between the electrode 5 and the body 6 to be welded. The secondary winding 2 of the welding transformer 1, 2 is shunted by a capacitor 22 for letting the high frequency impulse pass, since otherwise the latter should have to pass through the welding transformer.

Fig. 5 illustrates a device in which, with respect to the devices shown in Figs. 1, 3 and 4, the choking coil 9 with special magnetic core and the impulse capacitor 8 have changed places.

While I have disclosed several embodiments of the present invention, it is to be understood that these embodiments are given by example only and not in a limiting sense, the scope of the present invention being determined by the objects and the claims.

I claim:

1. A device for arc welding by means of alternating current comprising, in combination, a source of alternating current such as a welding transformer, a capacitor for the periodic supply of voltage-impulses across the welding arc at points of time in the vicinity of those at which the welding current is zero, a choking coil having a magnetic core of great permeability and with a relatively small zone of transition between the unsaturated and the saturated condition, said capacitor and said choking coil forming part of an impulse or discharge circuit which cooperates with the welding arc, a circuit for periodically loading said capacitor and an impedance such as a choking coil forming part of said loading circuit, said impulse or discharge circuit and said loading circuit constituting together a composite auxiliary circuit of the welding device.

2. The welding device, as set forth in claim 1, in which inserted between the said loading circuit and the said impulse or discharge circuit is at least one second impulse circuit provided with a capacitor and a choking coil having a magnetic core of great permeability and with a relatively small zone of transition between the unsaturated and the saturated condition.

3. The welding device, as set forth in claim 1, in which means are provided for the pre-magnetization by direct current of said core of said choking coil of at least one impulse circuit, so as to permit said core to become saturated in one direction only by the current passing through said coil during the loading period of said capacitor.

4. The device, as set forth in claim 1, in which said loading circuit and said capacitor are so connected and so dimensioned as to constitute together an oscillatory circuit, of which the resonance frequency is equal to the frequency of said source of current.

5. The device, as set forth in claim 1, in which said loading circuit and said impulse circuit are so interconnected as to ensure that during the loading period of said capacitor the voltage of the latter has the same polarity as the voltage of the arc before passing zero and in which said choking coil of said impulse circuit is so dimensioned as to ensure that said coil is unsaturated at each point of time before that, at which the voltage of the arc passes zero, and only becomes saturated as a result of the change of polarity of the arc voltage after it has passed zero.

6. The device, as set forth in claim 1, which includes a welding transformer in which a second source of alternating current is provided and said loading circuit is fed by the series connection of the welding winding of said transformer or part of said winding and said second source, the voltage of said second source of alternating current being at any time equal and in opposition to the no-load voltage of said welding winding or said part thereof.

No references cited.